No. 670,534. Patented Mar. 26, 1901.
O. L. CARMICAL.
SEEDING MACHINE AND FERTILIZER DISTRIBUTER.
(Application filed July 27, 1900.)

(No Model.) 2 Sheets—Sheet 1.

Witnesses
Harry S. Rohrer,
J. D. McCleary.

Inventor
O. L. Carmical.
By Victor J. Evans.
Attorney

THE NORRIS PETERS CO., PHOTO-LITHO., WASHINGTON, D. C.

No. 670,534. Patented Mar. 26, 1901.
O. L. CARMICAL.
SEEDING MACHINE AND FERTILIZER DISTRIBUTER.
(Application filed July 27, 1900.)
(No Model.) 2 Sheets—Sheet 2.
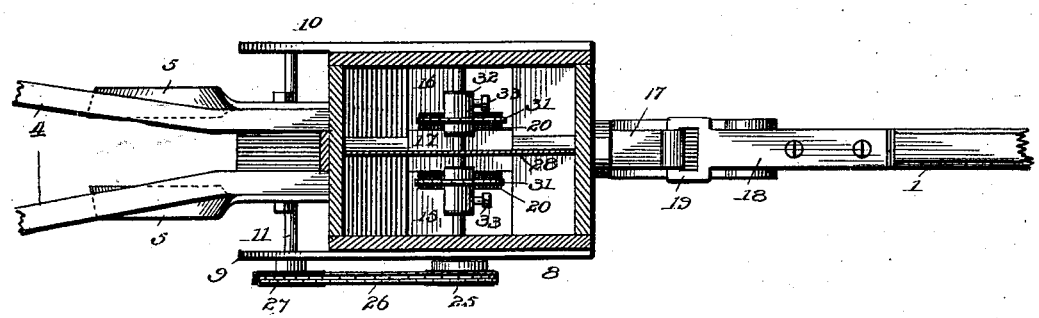
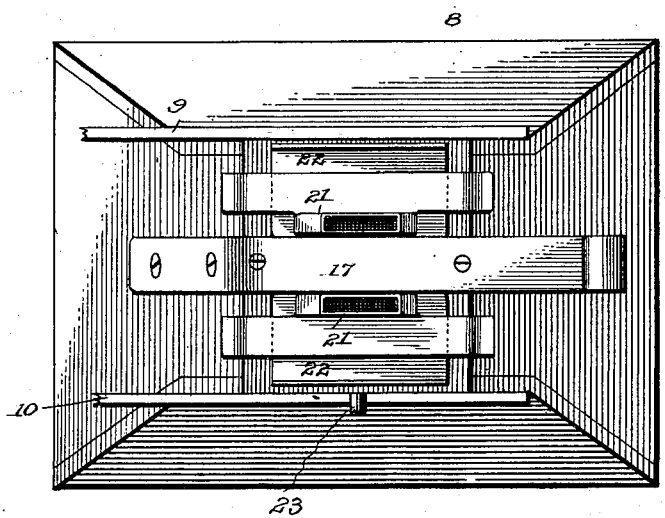

UNITED STATES PATENT OFFICE.

OLIVER L. CARMICAL, OF NEWNAN, GEORGIA.

SEEDING-MACHINE AND FERTILIZER-DISTRIBUTER.

SPECIFICATION forming part of Letters Patent No. 670,534, dated March 26, 1901.

Application filed July 27, 1900. Serial No. 25,062. (No model.)

*To all whom it may concern:*

Be it known that I, OLIVER L. CARMICAL, a citizen of the United States, residing at Newnan, in the county of Coweta and State of Georgia, have invented new and useful Improvements in Seeding-Machines and Fertilizer-Distributers, of which the following is a specification.

My invention relates to a combined fertilizer-distributer and planter, the primary object being to provide a machine of this character of simple and effective construction adapted to deposit a quantity of guano or other fertilizer in advance of the dropping of the seed, the spout for distributing the fertilizer being located in rear of the plow.

The further object of the invention is to secure the box or hopper which contains fertilizer and seed in such a manner as to permit of an agitation thereof as the machine travels over the ground.

The further object of the invention is to provide effective means for expelling the contents of the box or hopper and forcing it through the discharge-spouts.

The construction of the improved machine will be fully described hereinafter in connection with the accompanying drawings, which form a part of this specification, and its novel features will be particularly pointed out in the appended claims.

Figure 1:
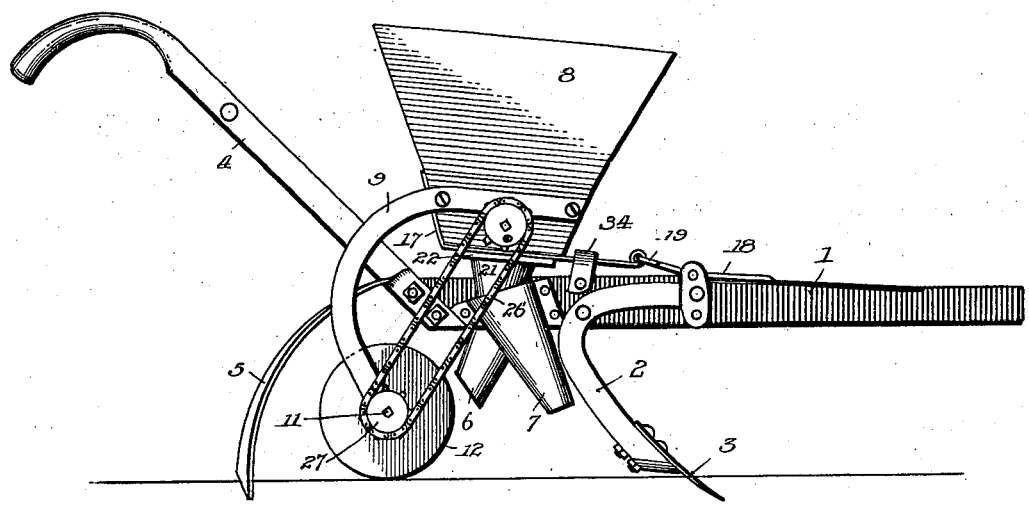
Figure 2:
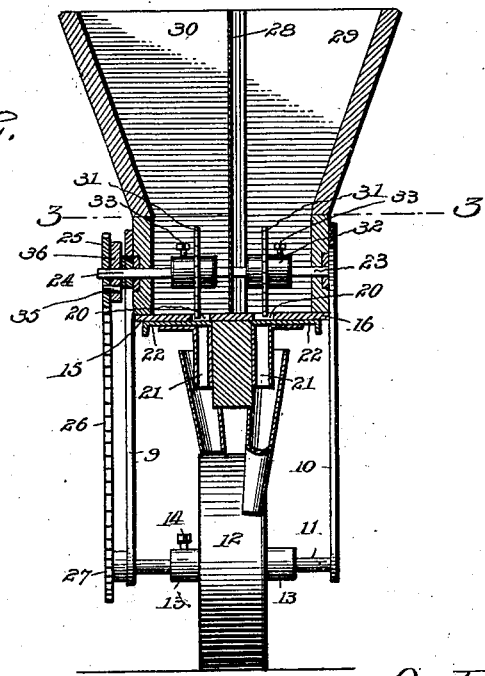

In the drawings, Figure 1 is a side elevation of a machine embodying the invention. Fig. 2 is a vertical section thereof. Fig. 3 is a horizontal section on the line 3 3 of Fig. 2, and Fig. 4 is a reverse or bottom plan view of the hopper or box detached from the machine.

The reference-numeral 1 designates a plow-beam, to which is secured a standard 2, carrying a shovel 3.

To the rear end of the beam 1 are secured the usual handles 4, to the lower ends of which are secured covering-blades 5.

On opposite sides of the beam 1 are secured detachable chutes 6 and 7, which are inclined in opposite directions, as illustrated in Fig. 1, the chute 6 projecting rearward and the chute 7 inclining toward the standard 2 to discharge fertilizer immediately behind the standard.

8 designates a box or hopper secured upon the beam 1 by means hereinafter described and having secured to its opposite sides curved arms 9 and 10, formed at their lower ends with bearings for a shaft, upon which is mounted a wheel 12. This wheel is preferably formed with integral sleeves or collars 13 and is adapted to be held upon the shaft by set-screws 14. The bottom of the hopper 8 consists of two sections 15 and 16, (see Fig. 2,) and between said sections is secured a metallic strap 17, which is bent upward at its rear end and secured to the rear side of the hopper, while its front end projects beyond the bottom of the hopper and is bent upon itself for pivotal attachment to a strap 18, formed with a loop 19 and constituting the stationary member of a hinge, of which the strap 17, passing under the hopper, is the movable member.

Open spaces 20 are left between the inner sides of the plates 15 and 16 and the hinge member 17 for the passage of the seed and fertilizer, and below each of the openings 20 is arranged a depending spout 21, through which the contents of the hopper passes to the chutes 6 and 7. Between the spouts 21 and the bottom plates 15 and 16 of the hopper are arranged slides 22, which close the openings 20 when desired.

Within suitable bearings formed in the sides of the hopper 8 is mounted a shaft 23, one end 24 of which projects beyond the side of the hopper. Upon the projecting end 24 of the shaft 23 is mounted a sprocket-wheel 25, connected, by means of a sprocket-chain 26, with a sprocket-wheel 27, mounted upon the shaft 11.

The hopper 8 is divided by a longitudinal vertical partition 28 into two separate compartments 29 and 30, and within each of said compartments upon the shaft 23 is mounted a toothed wheel 31, preferably secured upon the shaft detachably by means of collars 32 and set-screws 33.

34 designates a loop or spanner extending over the front end of the hinge member 17 and secured at its ends to the opposite sides of the beam 1 and serving to limit the upward movement of the hinge member 17.

The operation of the mechanism constructed as thus described is as follows: The compartment 29 is supplied with seed and the compartment 30 with guano or other fertilizer.

As the machine is drawn forward the rotation of the shaft 11 revolves the shaft 23 through the intermediacy of the sprocket wheels and chain 26, thus imparting a rotary motion to the toothed wheels 31, causing them to force downward and eject the contents of the hopper. The fertilizer from the compartment 30 drops immediately behind the shovel 3 and is covered by the soil which passes around the standard 2, and the seed is dropped in front of the wheel 27 and is subsequently covered by the coverers 5.

In addition to providing the rotary wheels for forcing the seed and fertilizer from the hopper into the chutes 6 and 7 the hinge connection of the hopper with the beam 1 causes the hopper to be raised and lowered by means of the arms 9 and 10, shaft 11, and wheel 12, thus shaking or agitating the hopper to assist in the downward feed of the contents thereof.

Any suitable means may be employed for preventing the rotation of the shaft 23 when desired.

In the drawings, Fig. 2, the sprocket-wheel 25 is loosely mounted upon the shaft 23 and formed with an opening to receive a screw 35, which passes through a disk 36, fixed upon the shaft, thus securing the sprocket-wheel 25 to the disk and causing said shaft to revolve with the sprocket-wheel.

I would have it understood that I reserve the right to make all such modifications and variations in the details of construction of the mechanism as may be resorted to without departing from the invention as defined by the following claims.

I claim—

1. In a combined seeding-machine and fertilizer-distributer, the combination with a plow-beam, and plow, of a hopper having a hinged connection with said beam and divided into separate compartments; a shaft mounted in bearings formed in the hopper; toothed wheels on said shaft within the hopper; curved depending arms secured to opposite sides of the hopper; a shaft mounted in bearings at the lower ends of said curved arms, a wheel mounted on said shaft; means for revolving the hopper-shaft by the revolution of the shaft carried by the curved arms, a closure for the bottom of the hopper comprising a hinge member passing under the hopper, plates located on opposite sides of said hinge member, and slides for closing the discharge-spaces of the bottom.

2. In a combined seed-planter and fertilizer-distributer, the combination with a plow and beam, of a hopper; a hinge for securing the hopper upon the beam, comprising a strap or member secured to the beam, and a strap or hinged member extending under the hopper and having a pivotal connection with the other hinge member; curved arms secured to opposite sides of the hopper, a shaft supported in bearings of the curved arms; a wheel mounted on said shaft; discharge-spouts depending from the bottom of said hopper; and discharge-chutes below the hopper and at opposite inclinations.

3. In a combined seed-planter, and fertilizer-distributer, the combination with a plow-beam; of a hopper divided by a central vertical partition into two separate compartments; a closure for the bottom of the hopper, comprising two independent plates, having a discharge-space between them; a hinged member passing under the hopper between said plates, discharge-spouts located on opposite sides of the beam; discharge-chutes below said spouts, and inclined in opposite directions; a revoluble shaft mounted in bearings of the hopper; toothed wheels on said shaft; and means for revolving said shaft by the travel of the machine.

In testimony whereof I affix my signature in presence of two witnesses.

OLIVER L. CARMICAL.

Witnesses:
JACK POWELL,
H. W. ARNALL.